(No Model.)

J. B. SCHRODER.
SASH PULLEY.

No. 315,347. Patented Apr. 7, 1885.

Attest_
Casper Miles.
M. M. Oliver

Inventor_
John B. Schroder
By Geo. J. Murray Atty

UNITED STATES PATENT OFFICE.

JOHN B. SCHRODER, OF CINCINNATI, OHIO.

SASH-PULLEY.

SPECIFICATION forming part of Letters Patent No. 315,347, dated April 7, 1885.

Application filed January 9, 1885. (No model.)

*To all whom it may concern:*

Be it known that I, JOHN B. SCHRODER, a citizen of the United States, and a resident of Cincinnati, in the county of Hamilton and State of Ohio, have invented certain new and useful Improvements in Sash-Pulleys, of which the following is a specification.

The object of my invention is to cheaply construct a sash-pulley having a non-wearing journal-bearing. Sash-pulleys when in use are not easily accessible for the purpose of lubricating them, and it is found that after a short use they begin to work hard, make a disagreeable noise when the sashes are raised or lowered, and the bearings are soon "cut" and the pulleys destroyed. To overcome these objections, I core out a space within the pulley in casting it, and then insert the journal, and mold Babbitt metal around the journal within the recess formed by the core.

Figure 1:
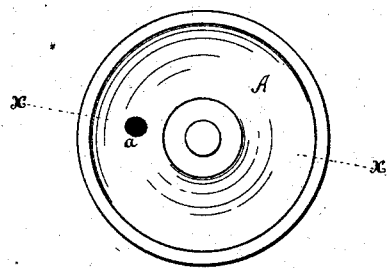
Figure 2:
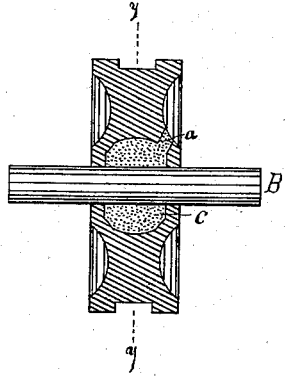
Figure 3:
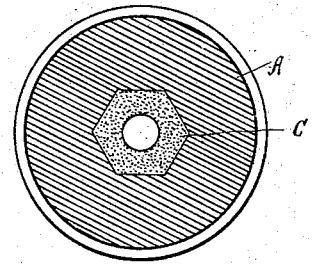

In the accompanying drawings, Figure 1 is a side elevation of my pulley. Fig. 2 is a radial section of the same, taken through line *x x* of Fig. 1. Fig. 3 is a central section taken through line *y y* of Fig. 2.

The pulley A is cast of any suitable metal. The center of the pulley is cored out to receive the polished journal B and the Babbitt metal bearing C. (Shown in stipled section in Figs. 2 and 3.) From the annular depression in one side of the pulley a hole, *a*, is bored, to meet the hollow space in the center of the pulley. The pulley shown has a flat groove around the periphery to receive the weight-chain or a flat metal band. When a cord is to be used, these grooves will be of course semicircular in cross-section. After the pulley is cast it is placed flat upon its side with the hole *a* uppermost. The journal B, which snugly fits the openings in the walls of the central chamber, is then inserted, one end resting upon the piece the pulley is resting upon. The Babbitt metal C is now poured into the depression in the side of the pulley, and flowing through the opening *a* is molded around the journal B within the pulley. A perfect non-wearing bearing is thus secured at no greater cost than the common pulley now generally used.

It is not intended herein to broadly claim the non-wearing or anti-friction journal-bearing; nor does the invention relate to any particular material for the non-wearing bearing, but is limited to the peculiar chamber, as shown, and adapted to receive any well-known anti-friction bearing, which may be molded within said chamber and around the axle.

What I claim, and desire to secure by Letters Patent, is—

The pulley A, having within it the central chamber and opening, *a*, and the non-wearing bearing C, molded within said chamber and around the journal B, substantially as shown and described.

JOHN B. SCHRODER.

Witnesses:
ALFRED B. BENEDICT,
CASPER MILES.